(12) United States Patent
Salsberg

(10) Patent No.: US 9,332,696 B2
(45) Date of Patent: May 10, 2016

(54) SPRINKLER CONTROL MODULE

(71) Applicant: Paul Salsberg, Toronto (CA)

(72) Inventor: Paul Salsberg, Toronto (CA)

(*) Notice: Subject to any disclaimer, the term of this patent is extended or adjusted under 35 U.S.C. 154(b) by 150 days.

(21) Appl. No.: 13/894,885

(22) Filed: May 15, 2013

(65) Prior Publication Data

US 2014/0339326 A1 Nov. 20, 2014

(51) Int. Cl.
| | |
|---|---|
| *B05B 12/12* | (2006.01) |
| *B05B 12/08* | (2006.01) |
| *F16K 37/00* | (2006.01) |
| *A01G 25/16* | (2006.01) |
| *F03B 13/00* | (2006.01) |

(52) U.S. Cl.
CPC ............. *A01G 25/167* (2013.01); *B05B 12/12* (2013.01); *F03B 13/00* (2013.01); *F05B 2220/20* (2013.01); *F05B 2220/602* (2013.01); *Y02P 60/122* (2015.11)

(58) Field of Classification Search
CPC ...... B05B 12/12; B05B 12/08; A01G 25/167; F16K 37/00
USPC ................ 239/63, 64, 67, 69; 137/78.2, 78.3; 700/284; 251/129.04
See application file for complete search history.

(56) References Cited

U.S. PATENT DOCUMENTS

| | | | |
|---|---|---|---|
| 2,906,952 A * | 9/1959 | Horecky | G01N 27/048 239/63 |
| 3,847,351 A | 11/1974 | Hasenbeck | |
| 3,874,590 A | 4/1975 | Gibson | |
| 3,896,834 A * | 7/1975 | Paul, Jr. | F16K 1/40 137/625.28 |
| 4,055,200 A | 10/1977 | Loboff | |
| 4,253,606 A | 3/1981 | Johnson | |
| 4,796,654 A | 1/1989 | Simpson | |
| 4,852,802 A * | 8/1989 | Iggulden | A01G 25/167 137/78.3 |
| 4,938,248 A | 7/1990 | Browne | |
| 5,060,859 A | 10/1991 | Bancroft | |
| 5,100,056 A * | 3/1992 | Theodorsen | A01G 25/162 239/63 |
| 5,148,826 A | 9/1992 | Bakhshaei | |
| 5,148,895 A | 9/1992 | Kakizaki | |
| 6,016,971 A | 1/2000 | Welch | |
| 6,019,290 A * | 2/2000 | Grott | A01G 25/167 137/78.3 |
| 6,079,433 A | 6/2000 | Saarem | |
| 6,378,779 B1 | 4/2002 | Taylor | |
| 6,948,492 B2 * | 9/2005 | Wermeling et al. | 128/200.14 |
| 6,978,794 B2 | 12/2005 | Duke et al. | |
| 6,978,984 B2 | 12/2005 | Kang | |
| 7,058,478 B2 * | 6/2006 | Alexanian | A01G 25/167 239/69 |
| 7,258,129 B1 | 8/2007 | Donahoo | |

(Continued)

FOREIGN PATENT DOCUMENTS

| | | |
|---|---|---|
| EP | NO 1308085 | 5/2013 |
| WO | WO/98/01021 A1 | 1/1998 |
| WO | WO/2005/099395 A2 | 10/2005 |

*Primary Examiner* — Arthur O Hall
*Assistant Examiner* — Joseph A Greenlund
(74) *Attorney, Agent, or Firm* — IP Global Patents; Andrew Alia; Carrie Stroup

(57) ABSTRACT

Sprinkler control units, that are designed to control water usage in residential and commercial above ground sprinkler systems, are disclosed herein. The sprinkler control units operate with any above-ground sprinkler system. They require reduced external power, and use the water flowing through the device to generate power. and are powered by the water flowing through the module. The modules are built with buried sensors that measure the ground saturation level, thus altering the water supply provided through the sprinkler system(s).

22 Claims, 18 Drawing Sheets

(56) References Cited

U.S. PATENT DOCUMENTS

| | | | |
|---|---|---|---|
| 7,613,546 B2 | 11/2009 | Nelson | |
| 7,681,356 B2 * | 3/2010 | Sheldrake | A01G 27/006 239/63 |
| 7,809,475 B2 * | 10/2010 | Kaprielian | A01C 23/042 137/78.3 |
| 7,836,910 B2 * | 11/2010 | Dresselhaus | G01N 27/223 137/78.3 |
| 7,916,458 B2 | 3/2011 | Nelson et al. | |
| 8,055,389 B2 * | 11/2011 | Holindrake | A01G 25/16 137/624.11 |
| 8,104,498 B2 | 1/2012 | Dresselhaus | |
| 8,225,810 B2 * | 7/2012 | Blanchard | A01G 25/167 137/78.3 |
| 8,371,325 B1 * | 2/2013 | Grizzle | F16K 31/12 137/78.3 |
| 8,733,672 B2 * | 5/2014 | Nations | B05B 3/02 239/237 |
| 8,905,152 B2 * | 12/2014 | Kling | A62C 33/00 169/23 |
| 2002/0124880 A1 | 9/2002 | Tanikawa | |
| 2005/0199842 A1 | 9/2005 | Parsons et al. | |
| 2006/0059683 A1 * | 3/2006 | Catalogna et al. | 29/890.08 |
| 2007/0267515 A1 * | 11/2007 | Sargent | A01G 27/003 239/63 |
| 2008/0255708 A1 | 10/2008 | Nies et al. | |
| 2010/0324744 A1 * | 12/2010 | Cox | A01G 27/003 700/284 |
| 2011/0155269 A1 | 6/2011 | Martin | |
| 2012/0223153 A1 * | 9/2012 | Helmsderfer | B05B 1/1654 239/1 |
| 2013/0248023 A1 * | 9/2013 | Estrada, Jr. | E03B 7/071 137/551 |
| 2013/0255783 A1 * | 10/2013 | Runge | A01G 25/167 137/1 |

\* cited by examiner

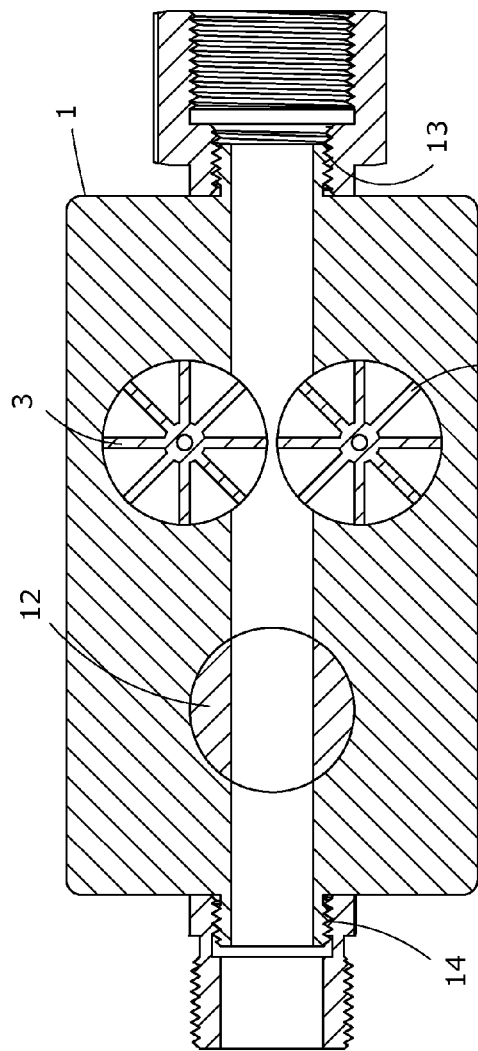
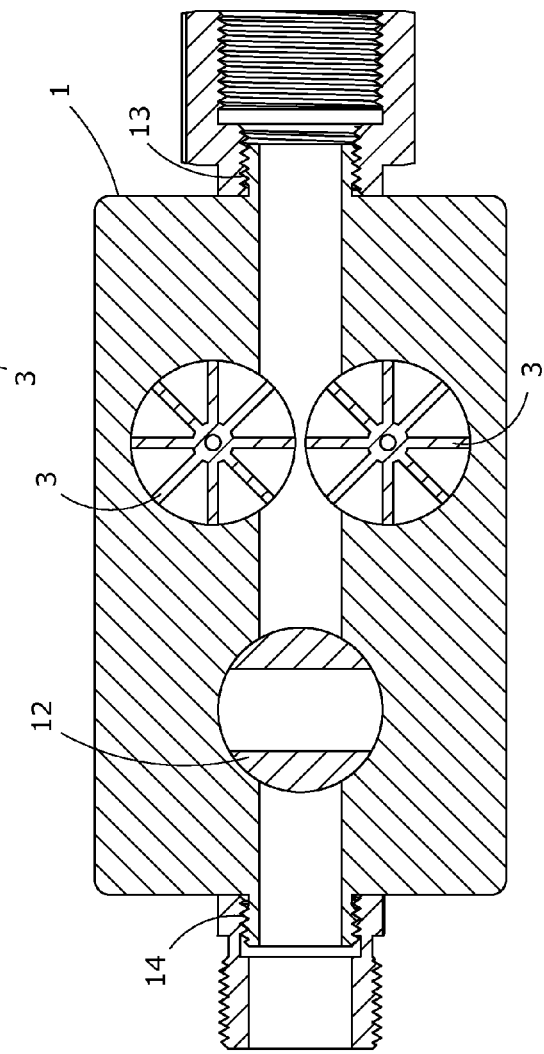
FIG. 8A
FIG. 8B

SPRINKLER CONTROL MODULE

REFERENCES CITED

| DOCUMENT | DATE FILED | AUTHOR(S) |
|---|---|---|
| U.S. PATENT DOCUMENTS | | |
| 3,847,351 | June 1973 | Hasenbeck |
| 3,874,590 | October 1973 | Gibson |
| 4,055,200 | November 1975 | Loboff |
| 4,253,606 | August 1979 | Johnson |
| 4,796,654 | January 1998 | Simpson |
| 4,852,802 | Aug. 8, 1988 | Iggulden et. Al. |
| 4,938,248 | May 1998 | Browne |
| 5,060,859 | January 1990 | Bancroft |
| 5,148,826 | September 1991 | Van Gelder |
| 5,148,895 | October 1991 | Kakizaki |
| 6,016,971 | February 1997 | Welch |
| 6,079,433 | September 1997 | Saarem |
| 6,378,779 | March 2000 | Taylor |
| 6,978,984 B2 | June 2003 | Kang |
| 7,258,129 B1 | March 2006 | Donahoo |
| 7,613,546 B2 | August 2005 | Nelson |
| 7,836,910 B2 | March 2005 | Dresselhaus |
| 7,916,458 B2 | October 2009 | Nelson et. Al. |
| 8,104,498 B2 | October 2010 | Dresselhaus |
| U.S. 2002/0124880 A1 | March 2002 | Tanikawa |
| U.S. 2005/0199842 A1 | December 2004 | Parsons et. Al. |
| U.S. 2008/0255708 A1 | March 2008 | Nies et. Al. |
| U.S. 2011/0155269 A1 | June 2011 | Martin |
| FOREIGN PATENT DOCUMENTS | | |
| WO/1998/001021A1 | July 1997 | Ragless |
| WO/2005/099395A2 | April 2005 | Lashgari |
| E.P. NO. 1,308,085 | October 2003 | Campau |

BACKGROUND OF THE INVENTION

Irrigation systems are used to ensure that grass lawns receive an adequate supply of water. Water sprinkler systems have been used to deliver the water to lawns. Control over the amount of water supplied by a sprinkler system is a critically important goal for sprinkler systems. If too much water is used, this not only increases costs, but also wastes water, a vital resource. The lawn being overwatered may also become damaged. If too little water is used, the lawn that is being watered may deteriorate.

Water conservation has become increasingly important throughout the world. Many areas have suffered, or are presently suffering, from water shortages. Water use for the purpose of watering residential lawns and gardens, and water use for agriculture, are two of the largest components of water usage, by percentage. They are also two of the largest ways in which water is wasted. Large amounts of water are wasted through overwatering. Overwatering can occur, for example, on a day when a sprinkler system distributes water in its pre-programmed amount, even though it may have rained less than 24 hours prior. The sprinkler system should instead distribute less water on such days, because the rain would presumably provide some of the water that the lawn requires.

Water usage can increase in some months, and decrease in others. The amount of water needed to adequately supply a given lawn can vary between individual days, because temperature can also vary between individual days.

Therefore, there is a need for a control system, for sprinklers, that can alter the amount of water supplied by the system, depending on the amount of water that is needed.

Existing irrigation systems generally work according to a timer. They supply water for a fixed period of time, then cut the water supply off. This creates problems because there is no guarantee that the amount of water supplied in the time period programmed into the sprinkler is the amount that is required by the lawn that is being watered.

Electrical sprinkler control systems have the added potential problem that they need an electrical/battery power supply in order to work. Therefore, they require electrical wiring and connection to an electrical power source. They are also vulnerable to failure if there is a "blackout" or other problem with the electrical power supply.

The United States, and the world, now face increasing problems associated with energy costs. Energy costs have started to negatively affect U.S., and global, economic growth.

Electrical sprinkler control systems use a large amount of electrical power. This increases energy costs to property owners.

A new type of sprinkler control system is needed that allows the sprinkler to distribute only the amount of water that is needed, and which requires a reduced power supply.

The Waterbug fulfills this requirement by generating its own power. The Waterbug is powered by the pressure of the water flowing through it. This gives the Waterbug substantial advantages over previous sprinkler control systems, because it uses a reduced amount of electrical power.

The Waterbug includes sensors that sense the amount of water that is present in the soil. When the amount of water present in the soil reaches a pre-programmed amount, the Waterbug turns off the water flowing into the sprinkler system. The Waterbug therefore reduces water waste significantly by immediately stopping water from flowing through the sprinkler system when such water is no longer needed.

Another advantage of the Waterbug is that it contains both the sensors to sense the amount of water in the soil, and the ability to stop the water flowing through the sprinkler system. Sensors that sense the amount of water in the soil have previously been patented, but few of these devices also included the ability to cut off a sprinkler system from watering the lawn. The fact that both these devices are included in the Waterbug makes the Waterbug more useful.

The Waterbug's ability to sense the amount of water in the soil, and stop the sprinkler system automatically when the water level hits a preprogrammed point, is very useful. When the weather changes, for example, when rains falls, the amount of watering that a lawn requires may vary. In such circumstances, the Waterbug will be able to automatically adjust the amount of water needed based on the amount of water that is needed to reach a pre-programmed level of soil moisture.

The Waterbug has the additional benefit that it can be used with any sprinkler system. It is therefore more versatile, and cheaper, than other, previously available, sprinkler control systems.

The Waterbug's combination of its ability to generate its own internal power, its ability to turn off the water flowing through the system if necessary, and Waterbug's ability to sense the water content of the soil, the Waterbug's ability to control water waste, and the fact that the Waterbug can be included with any sprinkler system make it different from any other product which has been patented or created.

DESCRIPTION OF RELATED ART

This invention is substantially different from previously patented devices. For example, U.S. Pat. No. 8,104,498 B2 discloses a moisture sensor which is connected to a device that shuts off the water in a sprinkler system, but, unlike the present invention, that device does not generate its own internal power. U.S. Pat. No. 7,836,910 B2 discloses a capacitance-based moisture sensor that is coupled to irrigation valves for use in sprinkler systems. However, the devices disclosed in U.S. Pat. No. 7,836,910 B2 do not have the versatility, or the capability, to be connected with every type of sprinkler system. This is a characteristic of the present invention. The present invention also generates its own internal power, and the devices disclosed in U.S. Pat. No. 7,836,910 B2 do not. U.S. Pat. No. 7,613,546 describes a modular controller for sprinkler systems, but this invention does not include a sensor for sensing moisture in the soil, and so is different from the present invention. The device described in U.S. Pat. No. 7,613,546 cannot generate its own internal power. The present invention can.

Application US2008/0255708 discloses a moisture sensing device that cuts off the water supply when a certain threshold is reached. However, this device cannot generate its own internal power. The present invention can. Application 2011/0155269 also describes a device which cuts off the water supply when a certain threshold is reached, but this device also has no ability to generate its own electrical power. U.S. Pat. No. 7,258,129 discloses a landscaping water system that includes a probe for monitoring soil moisture content and the ability to shut off the water supply when soil moisture content reaches a certain level, but these functions are not contained within the same device. The present invention does contain these functions in the same device, and also has the ability to generate electrical power internally. None of the other cited references have the ability to generate electrical power internally.

SUMMARY OF THE INVENTION

It is an objective of the present invention to provide an improved irrigation control module, which can generate electrical power internally.

It is another objective of the present invention to create an irrigation control module that contains both sensors that determine the moisture content in the ground, and the ability to shut off the supply of water flowing through the sprinkler system, in the same unit.

Another objective of the present invention is to create an irrigation control module that can be used with any sprinkler system.

The preferred embodiment of the invention is about the size of a standard smartphone.

The preferred embodiment of the invention is as follows: The "body" of the device is a plastic box, that contains a turbine and a small generator, and a channel for water to flow through. There are two openings, one on each end of the body. Water flows into one opening, the inlet, through the channel, and out the other opening, the outlet. The channel connects the inlet and the outlet. The force of the water flowing through the body turns the turbine, which, in turn, powers the generator, which provides electrical power for all components of the device that require power. There is also a battery, which the generator charges, so some of the electrical power produced by the device is stored. The components of the device that require electrical power may also draw on the battery for power, when water is not flowing through the body of the device. An electronic control mechanism, a solenoid, which controls a valve, and the valve are all also inside the body. The valve controls the flow of water through the channel. A hose is attached to the inlet, and another hose to the outlet. The second hose leads to the sprinkler system. Four legs hold the body above the ground. Sensors are at the tips of the legs, and are fully or partly buried in the ground. When the moisture level in the ground reaches a pre-programmed level, the sensors electronically communicate this through the legs, to an electronic control mechanism, which is attached to the solenoid. The solenoid causes the valve to shut off, stopping the flow of water through the body. This, in turn, shuts off the flow of water through the sprinkler system.

An additional embodiment would involve the above device, with the turbine and generator being removed, and with the solenoid, valve, and sensors being battery-powered.

A third embodiment would involve the device of the first embodiment, but with two legs, instead of four, and sensors attached to the two legs.

A fourth embodiment would be similar to the device of the first embodiment, but with the additional feature of having the ability to program the desired level of soil moisture into the module.

A fifth embodiment would be similar to the device of the first embodiment, but would involve the additional feature of making the device controllable by a "smart phone" or some other type of wireless communicator.

A sixth embodiment would be similar to the device of the first embodiment, but also programmed with the ability to automatically open the valve, thus allowing water to flow into the sprinkler system, when the soil is dry.

A seventh embodiment would be similar to the device of the first embodiment, but with the additional feature of a valve, designed so that when the user desires to open the valve, the pressure created by the water inside the device creates additional force, which helps the user to open the valve, and, when the user desires to close the valve, the pressure created by the water inside the device creates additional force, which helps the user to close the valve. Such valves are well-known in the art.

These embodiments are not intended to encompass all the possible variations of the invention. Other variations are possible.

BRIEF DESCRIPTION OF THE SEVERAL VIEWS OF THE DRAWINGS

FIGS. 8A and 8B show shows a "cut-away" view of the preferred embodiment from the perspective of a viewer above the device.

Figure 1:
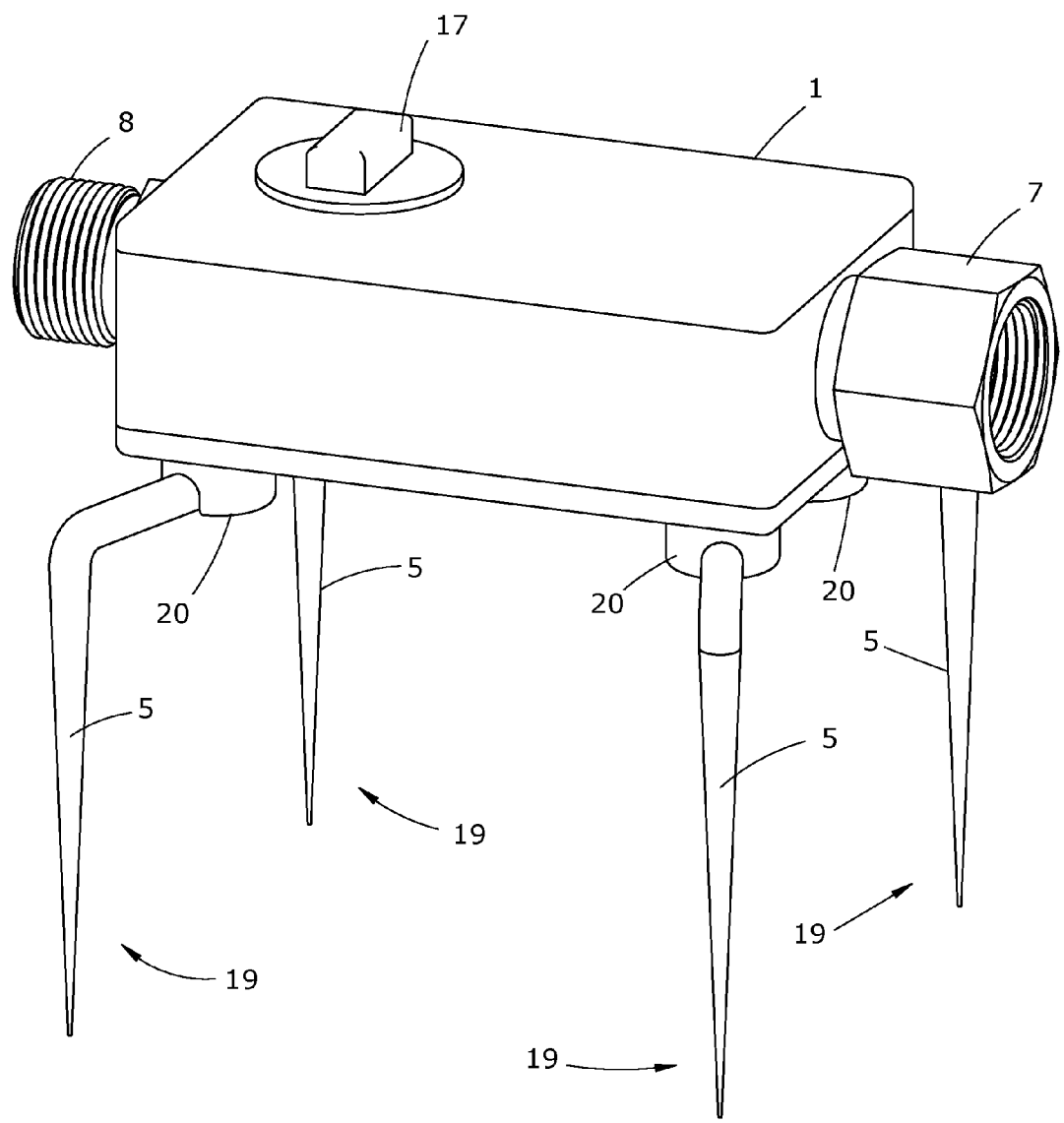
FIG. 1 shows a view from the left of the preferred embodiment.

The following numbers refer to the different items illustrated by the drawings:

Body (1), Frame (2), Turbine (3), Generator (4), Leg (5), Channel (6), Inlet (7), Outlet (8), Battery (9), Electronic control mechanism (10), Solenoid (11), Valve (12), Attachment of hose to inlet (13), Attachment of hose to outlet (14), Hose from water supply (15), Hose to sprinkler system (16), Valve lever (17), and spring (18) Sensors (19) leg attachment (20) Upper frame plate (21) Lower frame plate (22) Turbine magnets (23) Generator magnets (24).

DETAILED DESCRIPTION OF THE DRAWINGS

The following description is not to be taken in a limiting sense, but is made merely for describing the general purposes of the invention. The scope of the invention should be determined with reference to the claims. The present embodiments and examples address the problems described in the background, while also addressing additional problems, as will be seen from the following detailed description.

Referring to FIG. 1, The body (1) is shown, the legs (5) protrude down from the leg attachments (20) which are attached to the legs and the body. The inlet (7) and outlet (8) are attached to the body. The valve lever (17) is on the top of the body.

Figure 2:
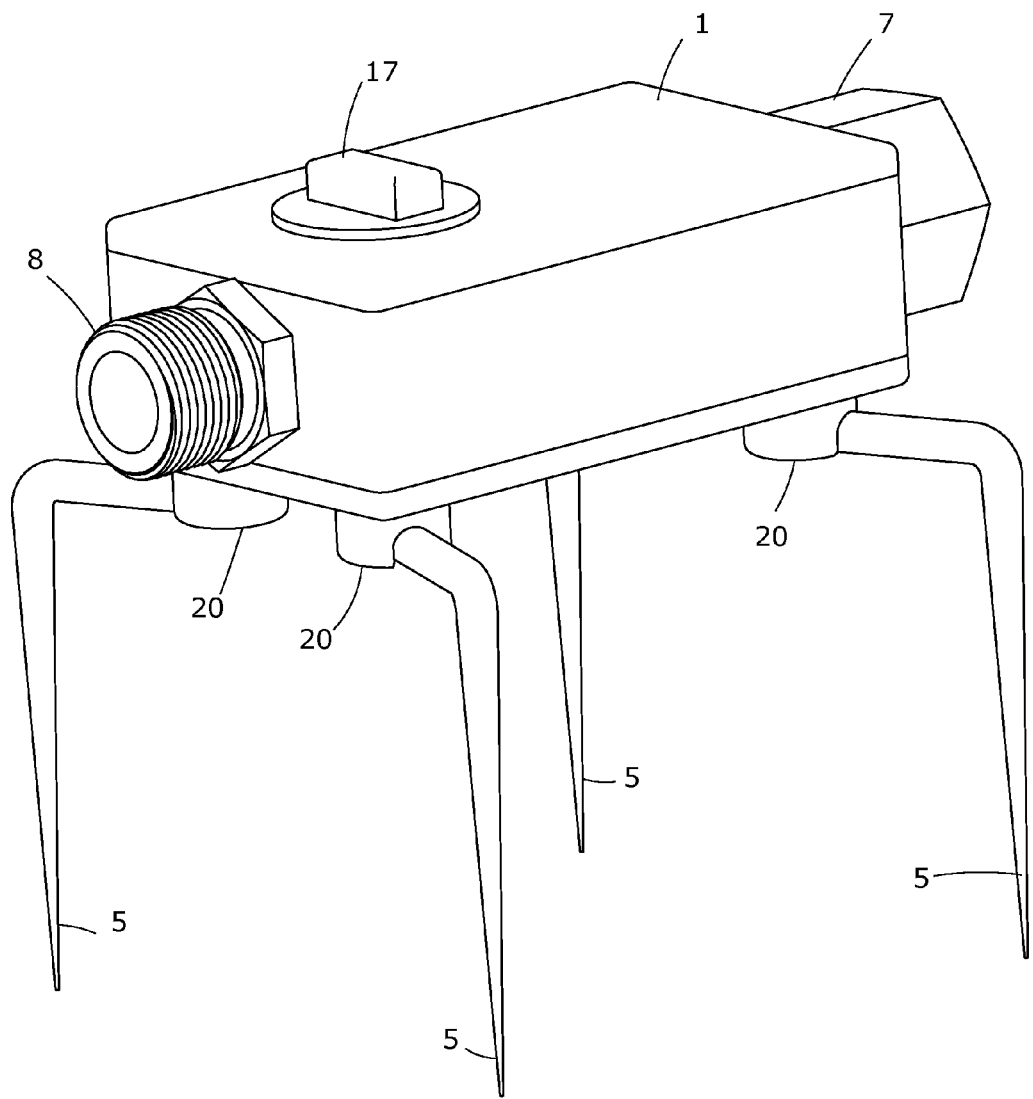
FIG. 2 shows a view from the left of the preferred embodiment with the outlet closer to the viewer than the inlet.

Referring to FIG. 2, The body (1) is shown, the legs (5) protrude down from the leg attachments (20) which are attached to the legs and the body. The inlet (7) and outlet (8) are attached to the body. The valve lever (17) is on the top of the body.

Figure 3:
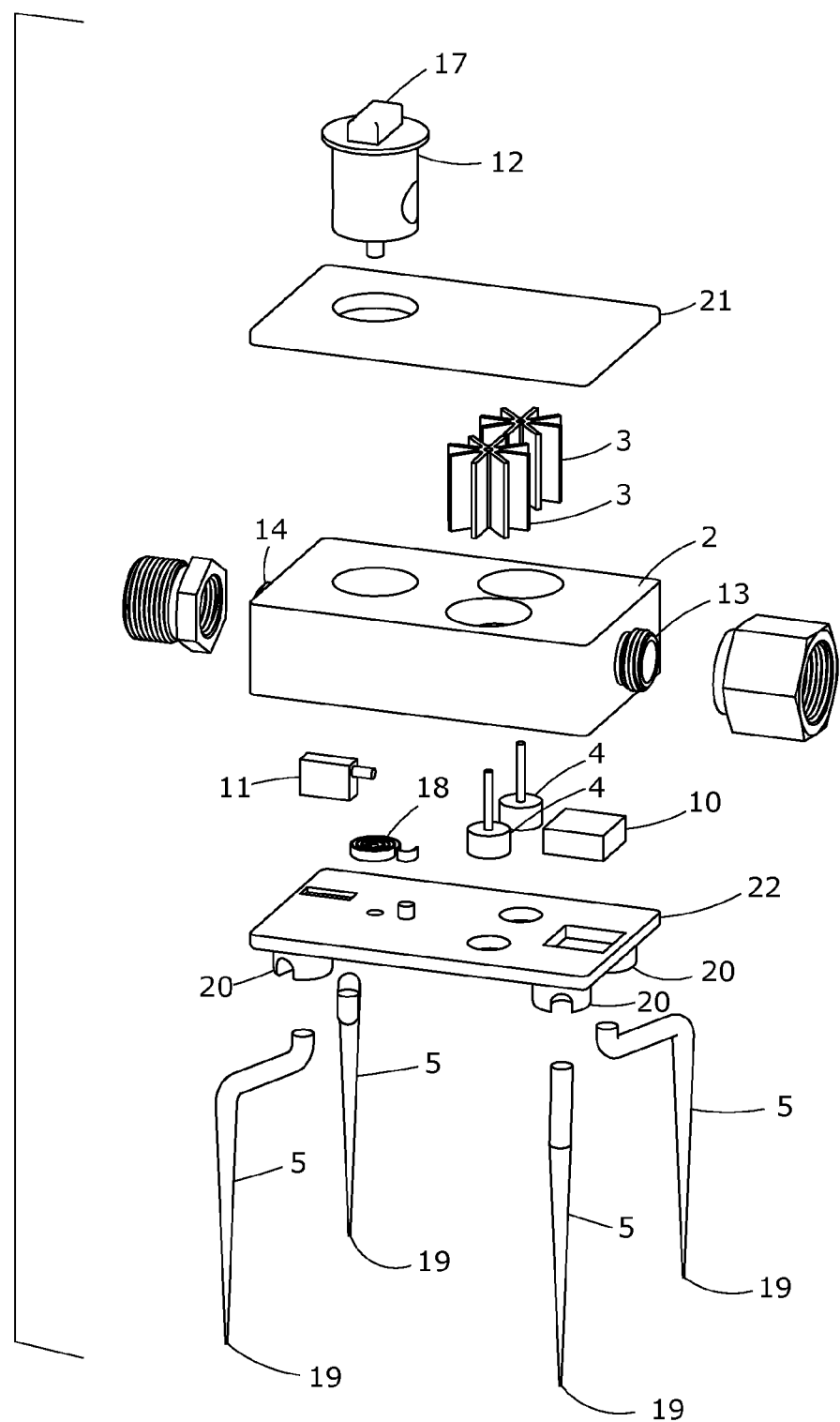
FIG. 3 shows a view of the disassembled components of the preferred embodiment.

Referring to FIG. 3, the legs (5) protrude down from the leg attachments (20). These are attached to the lower frame plate (22). The body (1), is divided into the frame (2), which contains two turbines (3), a generator (4), battery (9), Electronic control mechanism (10), Solenoid (11), Valve (12), Attachment of hose to inlet (13), attachment of hose to outlet (14). The valve lever (17) fits into the upper plate (21), and the spring (18) is shown.

Figure 4:
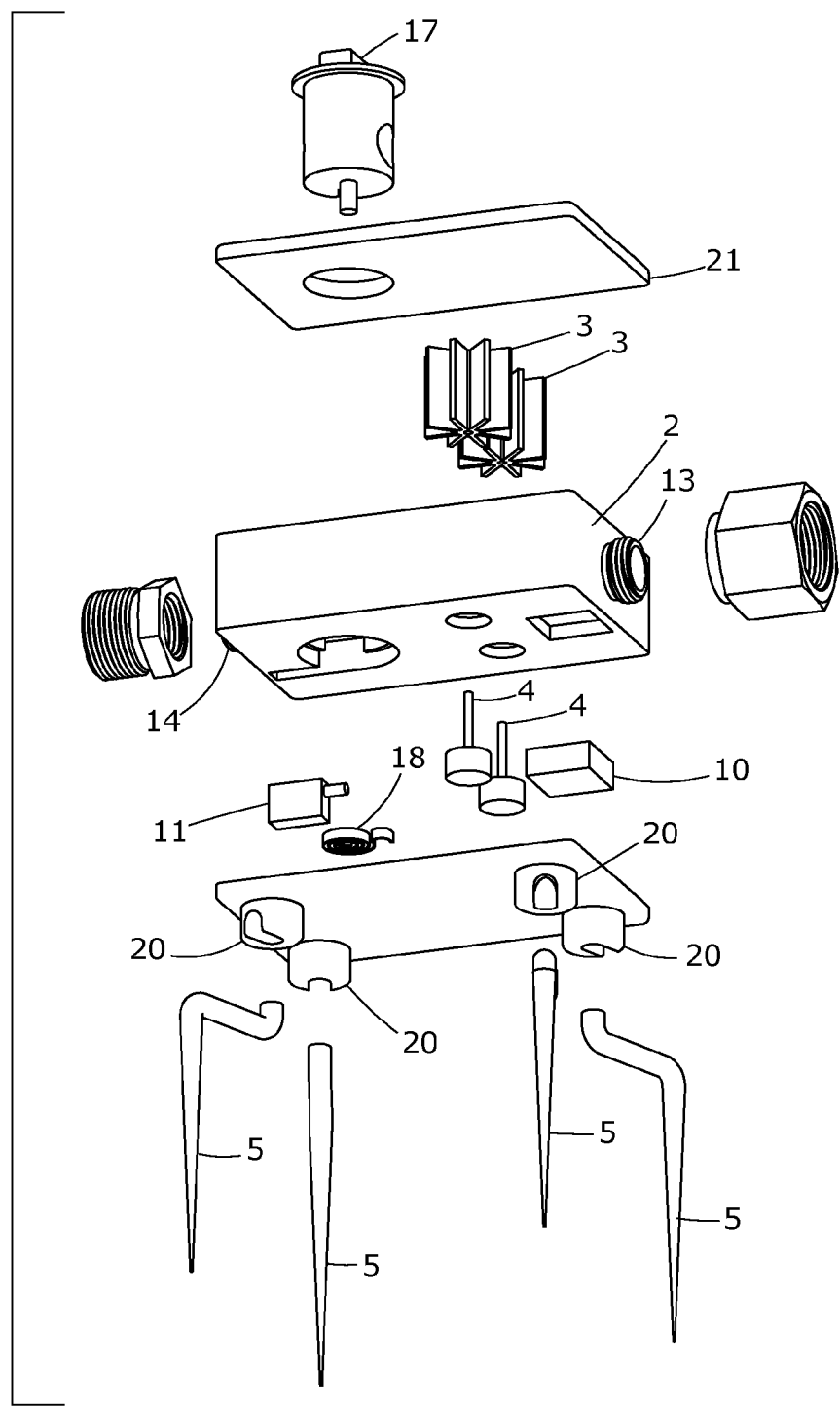
FIG. 4 shows a view of the disassembled components of the preferred embodiment from the perspective of a viewer to the left of the device looking up.

Referring to FIG. 4, the legs (5) protrude down from the leg attachments (20). These are attached to the lower frame plate (22). The body (1), is divided into the frame (2), which contains two turbines (3), a generator (4), battery (9), Electronic control mechanism (10), Solenoid (11), Valve (12), Attachment of hose to inlet (13), attachment of hose to outlet (14). The valve lever (17) fits into the upper plate (21), and the spring (18) is shown.

Figure 5:
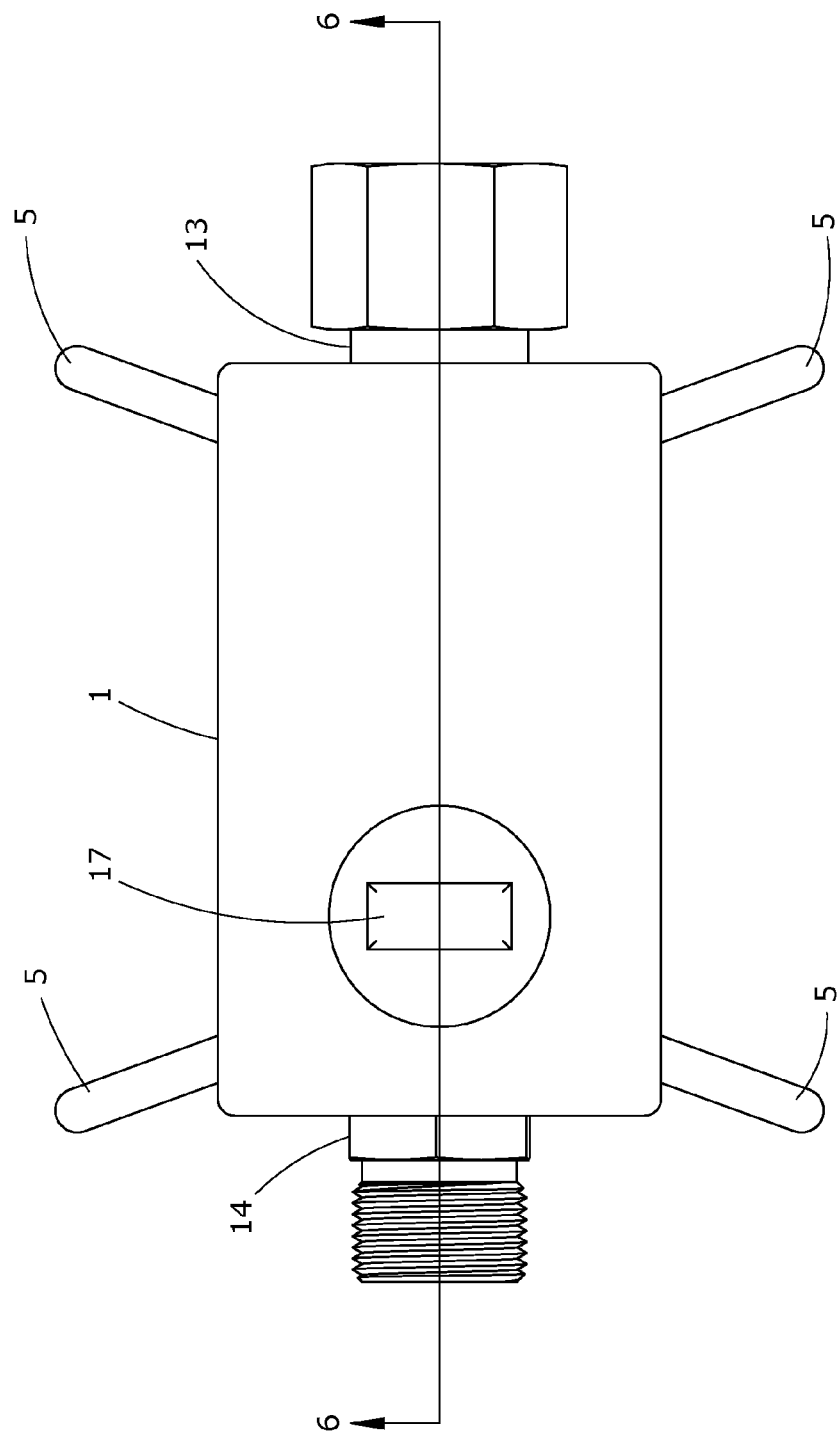
FIG. 5 shows a view of the preferred embodiment from the perspective of a viewer looking directly down.

Referring to FIG. 5, the attachment of hose to inlet (13), and attachment of hose to outlet (14) are shown attached to the body (2), the valve lever (17) is on top of the body (1), and the legs (5) can be seen.

Figure 6:
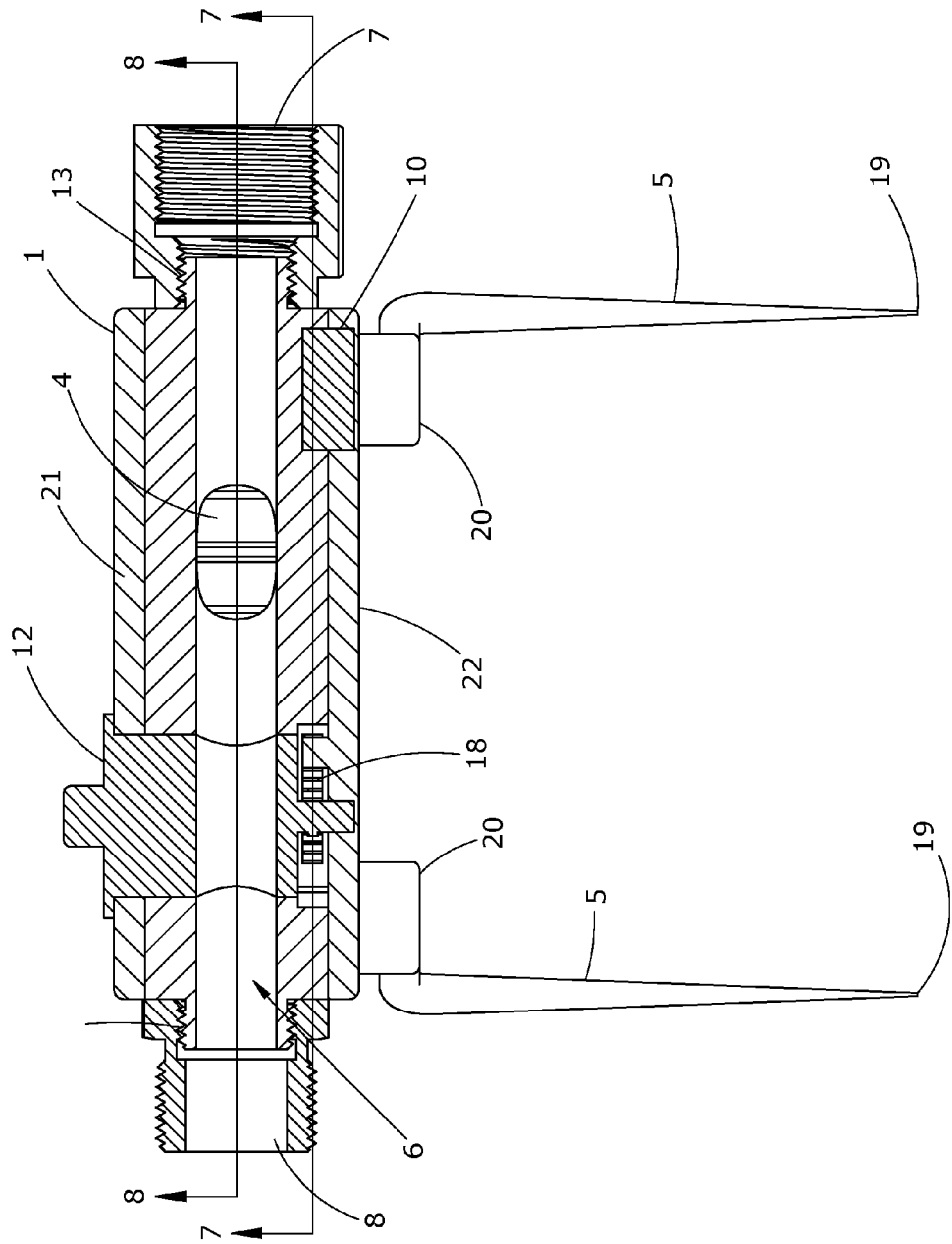
FIG. 6 shows a "cut-away" view of the preferred embodiment from the perspective of a viewer to the left of the device.

Referring to FIG. 6, the legs (5) and leg attachments (20) are shown, and the body (1) is shown. The attachment of hose to inlet (13), and attachment of hose to outlet (14) are also shown. The body (1) includes the frame (2), and the turbine (3), generator (4), channel (6), inlet (7), outlet (8), battery (9), electronic control mechanism (IO), Solenoid (11), Valve (12), and spring (18), all of which are housed within the frame. The body (1) also includes the lower frame plate (22) and upper frame plate (21).

Water flows into the body (1) through the inlet (7), and then through the channel (6), and out the outlet (8). The water turns the turbine (3), which in turn powers the generator (4). The generator (4) provides power to the electronic control mechanism (10), solenoid (11) and valve (12). When the water content in the ground reaches a pre-programmed level, the electronic control mechanism (10) causes the solenoid (11) to shut the valve (12). A hose from the water supply attaches to the attachment of hose to inlet (13). A hose to the sprinkler system attaches to the attachment of hose to the outlet (14). The user can also use the valve lever (17) to turn the valve (12) and manually turn off the unit. A hose from the water supply attaches to the attachment of hose to inlet (13). A hose to the sprinkler system attaches to the attachment of hose to the outlet (14).

Figure 7:
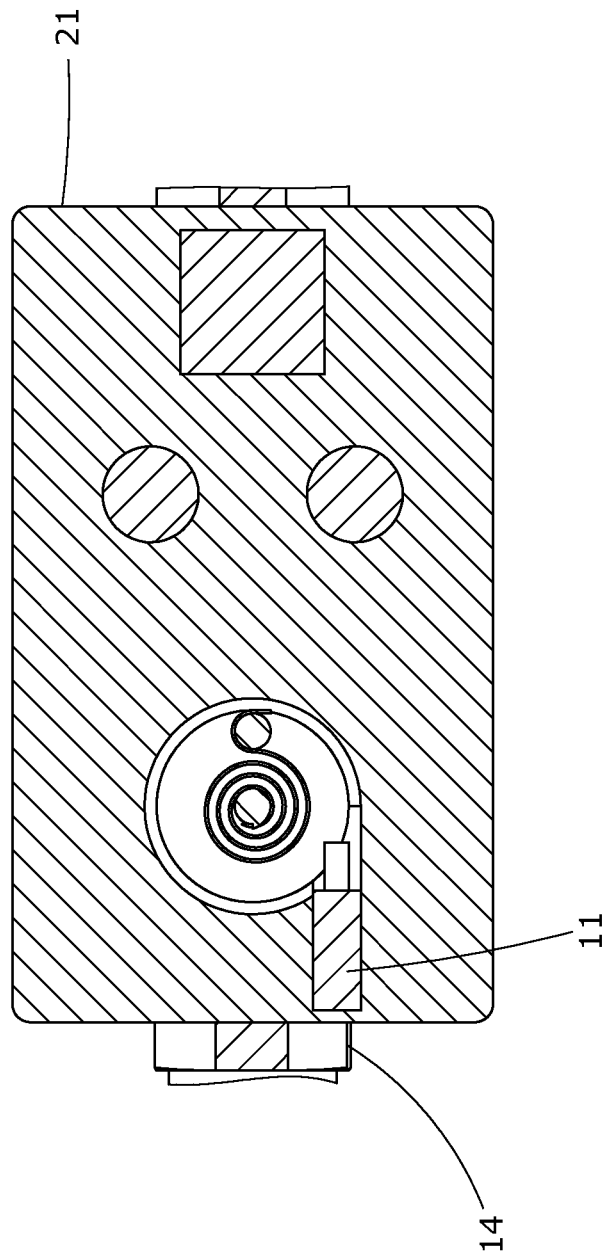
FIG. 7 shows a "cut-away" version of the preferred embodiment viewed from above, with the handle on top of the device removed, so that it is possible to see the solenoid below.

Referring to FIG. 7, the upper frame plate (21) is shown, with the attachment of hose to outlet (14), and the solenoid (11).

Referring to FIG. 8A, the body (1) is shown, and the attachment of hose to inlet (13) and the attachment of hose to the outlet (14) are shown attached to the body. The turbines (3) are shown, and the valve (12) is shown in an open position.

Referring to FIG. 8B, the body (1) is shown, and the attachment of hose to inlet (13) and the attachment of hose to the outlet (14) are shown attached to the body. The turbines (3) are shown, and the valve (12) is shown in a closed position.

Figure 9:
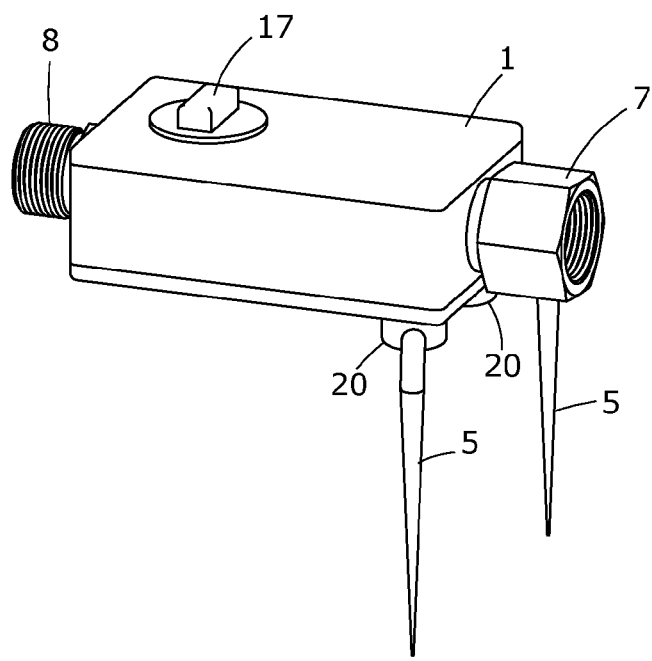
FIG. 9 shows a "bird's-eye" view of the third embodiment.

Referring to FIG. 9, The body (1) is shown, the legs (5) protrude down from the leg attachments (20) which are attached to the legs and the body. The inlet (7) and outlet (8) are attached to the body. The valve lever (17) is on the top of the body.

Figure 10:
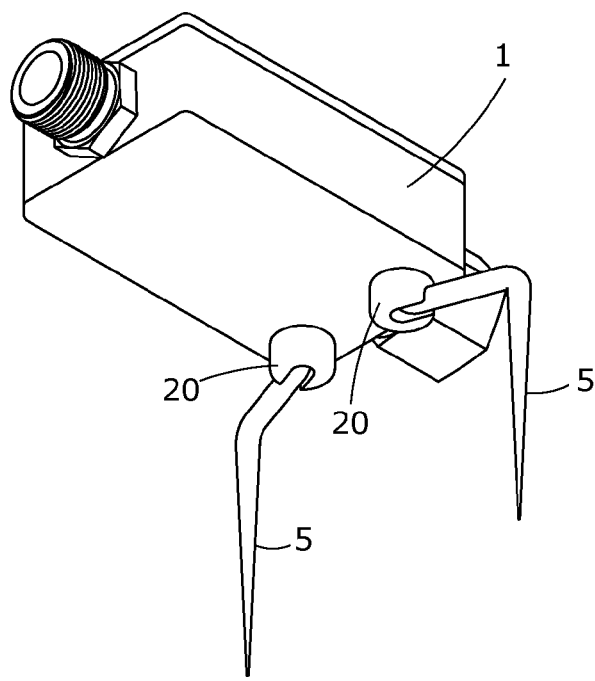
FIG. 10 shows the third embodiment from below.

Referring to FIG. 10, The body (1) is shown, the legs (5) protrude down from the leg attachments (20) which are attached to the legs and the body. The inlet (7) and outlet (8) are attached to the body.

Figure 11:
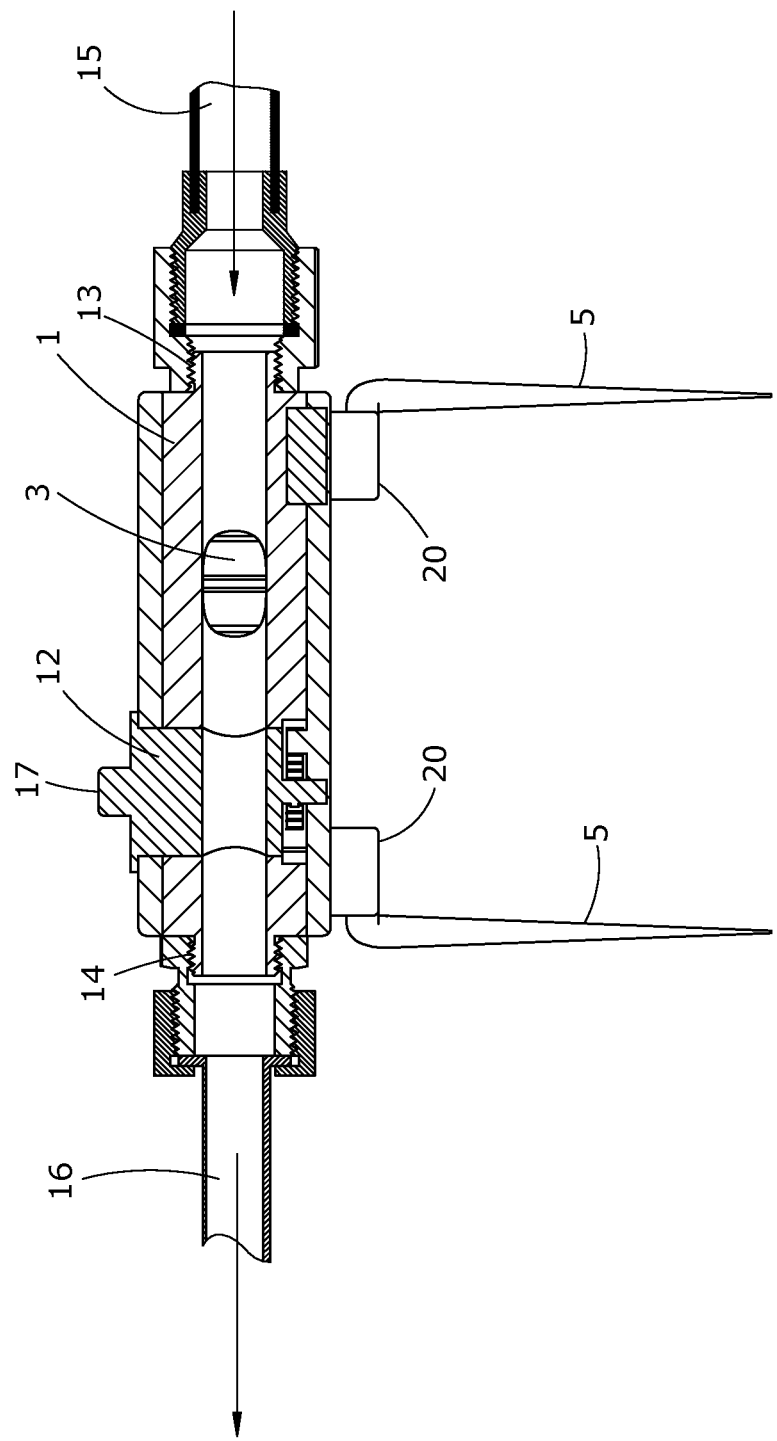
FIG. 11 shows a "cut-away" view of the preferred embodiment.

Referring to FIG. 11, a "cut-away" view of the body (1) is shown. The attachment of hose to inlet (13) and the attachment of hose to the outlet (14) shown attached to the body. Two legs (5) and leg attachments (20) are shown. The valve lever (17) and valve (12) are shown. The turbines (3) are shown. Hose from water supply (15), and a hose to sprinkler system (16) are shown.

Figure 12:
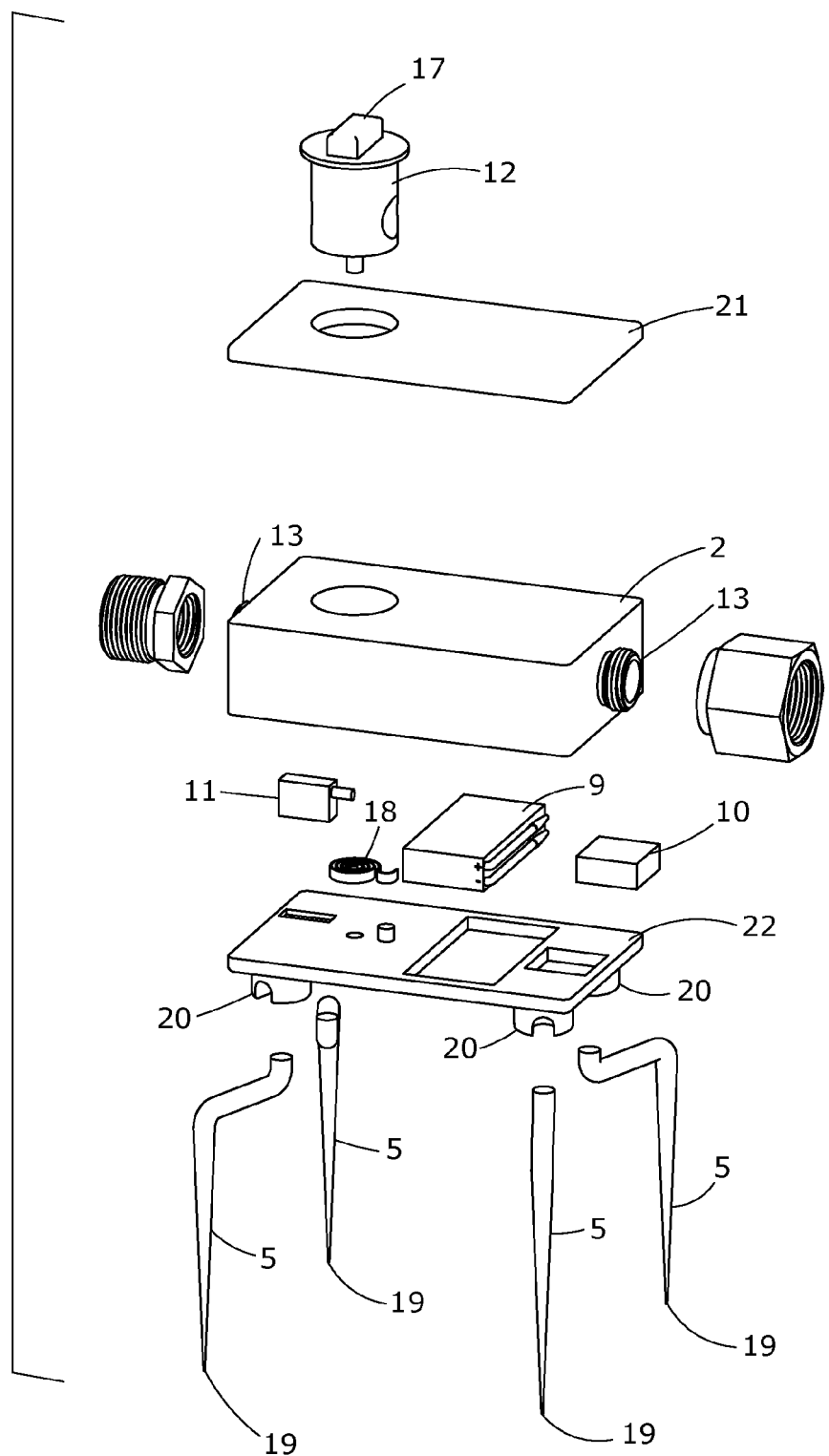
FIG. 12 shows a view of the disassembled components of the second embodiment of the device from the perspective of a viewer to the right.

Referring to FIG. 12, the legs (5) protrude down from the leg attachments (20). These are attached to the lower frame plate (22). The body (1), is divided into the frame (2), which contains a battery (9), Electronic control mechanism (10), Solenoid (11), Valve (12), Attachment of hose to inlet (13), attachment of hose to outlet (14). The valve lever (17) fits into the upper plate (21), and the spring (18) is shown.

Figure 13:
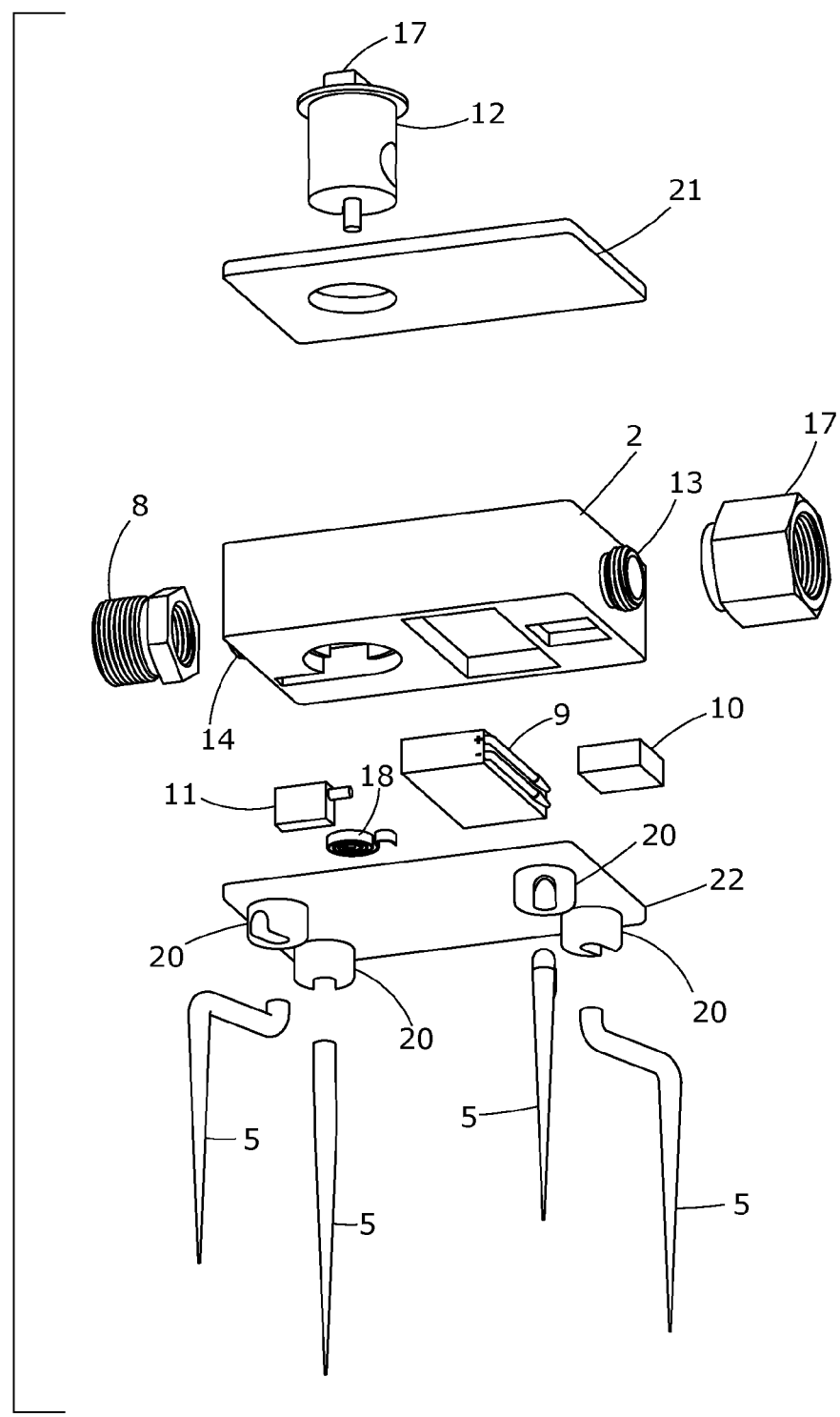
FIG. 13 shows a view of the disassembled components of the second embodiment from the perspective of a viewer to the left of the device looking up towards the device.

Referring to FIG. 13, the legs (5) protrude down from the leg attachments (20). These are attached to the lower frame plate (22). The body (1), is divided into the frame (2), which contains a battery (9), Electronic control mechanism (10), Solenoid (11), Valve (12), Attachment of hose to inlet (13), attachment of hose to outlet (14). The valve lever (17) fits into the upper plate (21), and the spring (18) is shown.

Figure 14:
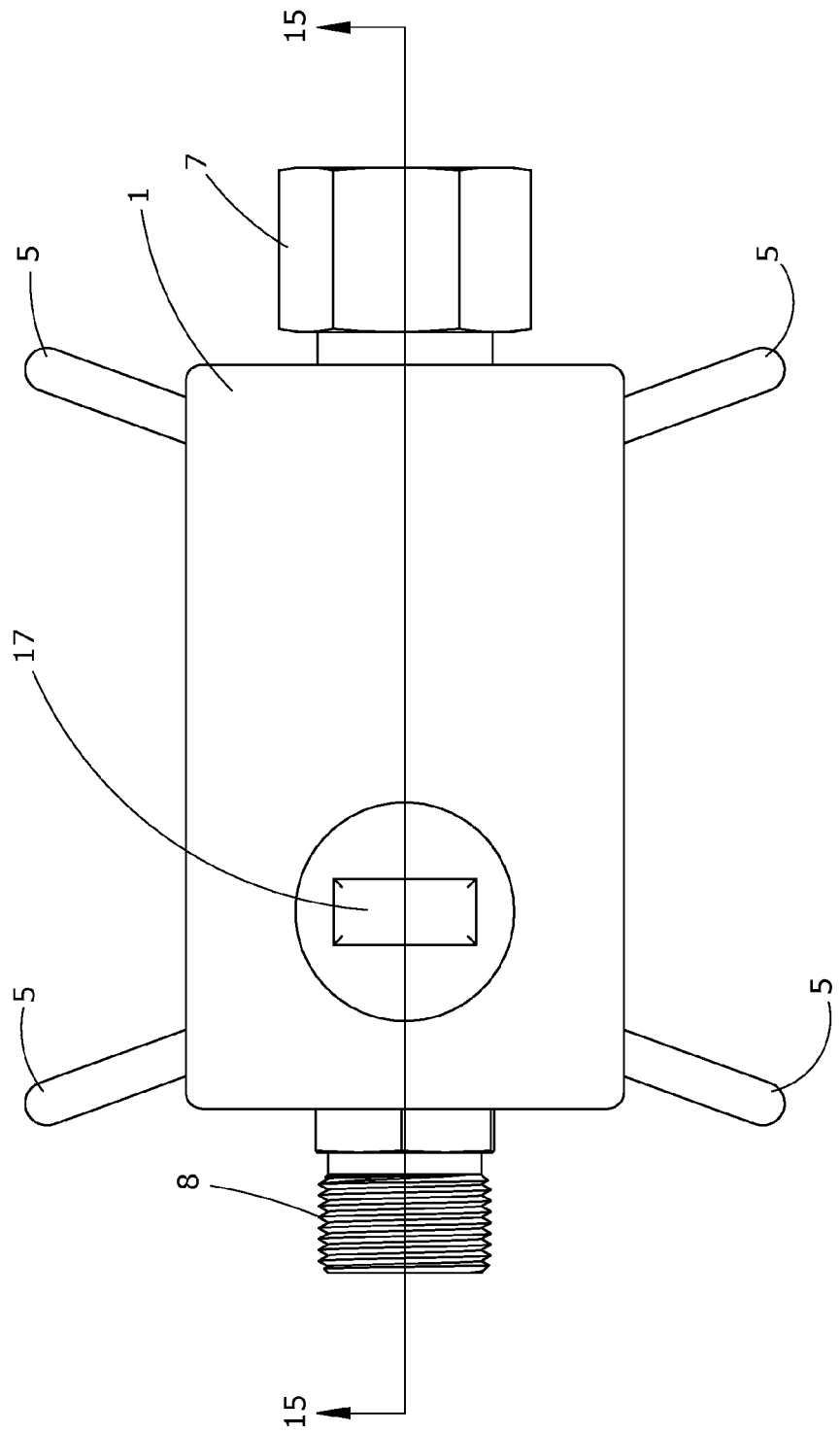
FIG. 14 shows the preferred embodiment from the perspective of a viewer directly above the device.

Referring to FIG. 14, The body (1) is shown, the legs (5) protrude down from the leg attachments (20) which are attached to the legs and the body. The inlet (7) and outlet (8) are attached to the body. The valve lever (17) is on the top of the body. The number 15 refers to the area being viewed by FIG. 15.

Figure 15:
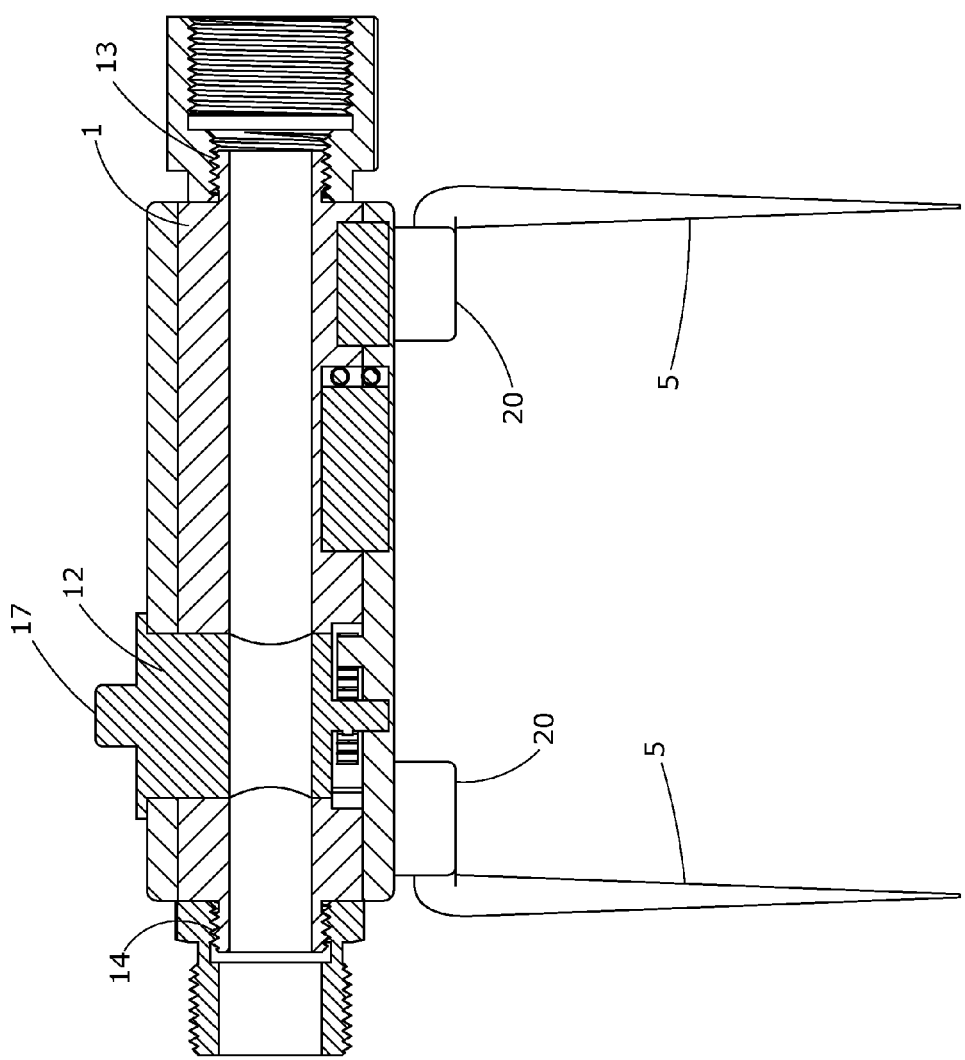
FIG. 15 shows a "cut-away" view of the preferred embodiment.

Referring to FIG. 15, a "cut-away" side view of the body (1) is shown. The attachment of hose to inlet (13) and the attachment of hose to the outlet (14) shown attached to the body. Two legs (5) and leg attachments (20) are shown. The valve lever (17) and valve (12) are shown. The turbines (3) are shown. Hose from water supply (15), and a hose to sprinkler system (16) are shown.

Figure 16:
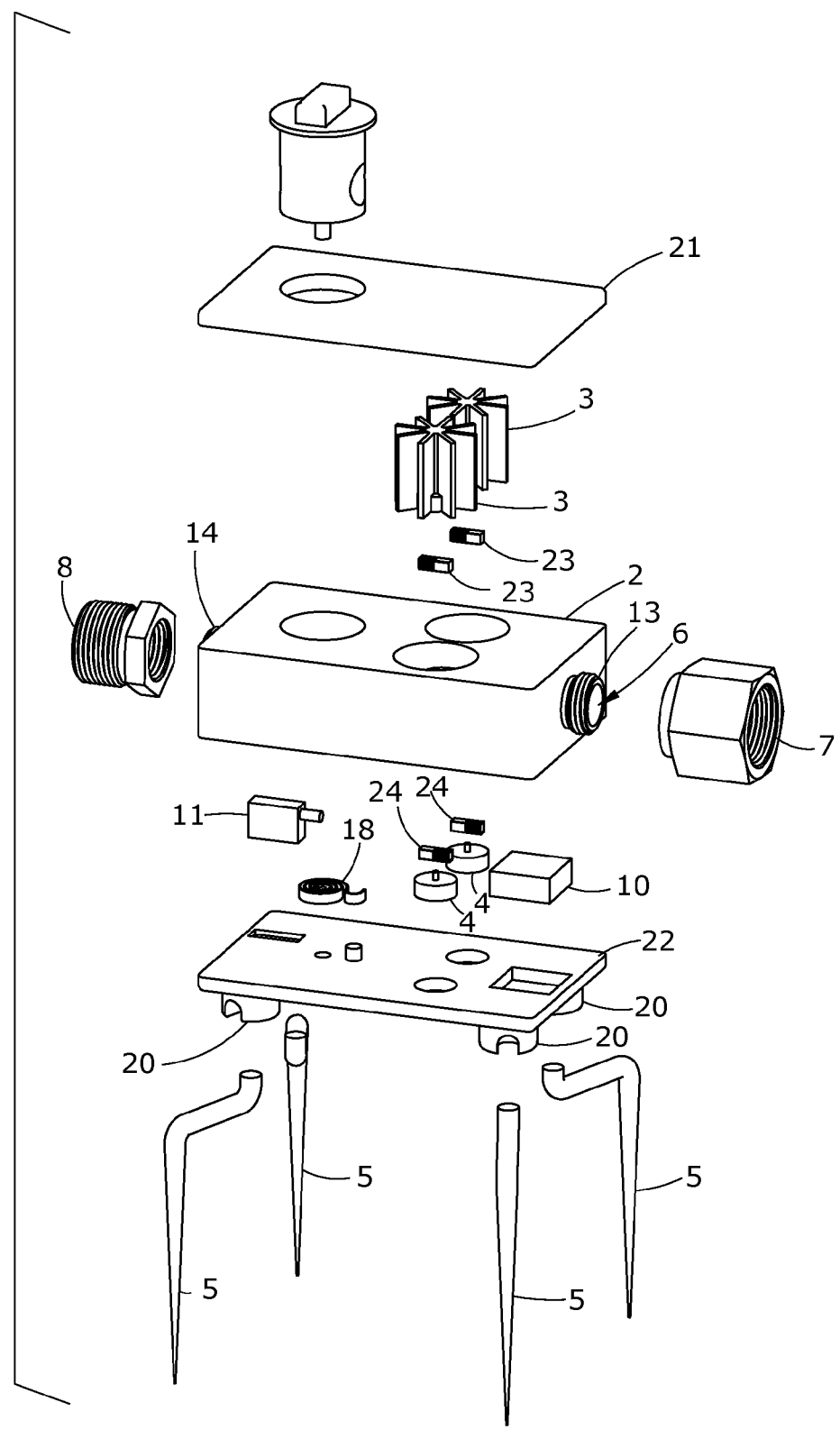
FIG. 16 shows the seventh embodiment from the perspective of a viewer to the right of the device, looking down at the device.

Referring to FIG. 16, the legs (5) and leg attachments (20) are shown, and the body (1) is shown. The attachment of hose to inlet (13), and attachment of hose to outlet (14) are also shown. The body (1) includes the frame (2), and the turbine (3), generator (4), channel (6), inlet (7), outlet (8), battery (9), electronic control mechanism (10), Solenoid (11), Valve (12), and spring (18), all of which are housed within the frame. The body (1) also includes the lower frame plate (22) and upper frame plate (21). The turbine magnets (23) and generator magnets (24) are also shown.

Figure 17:
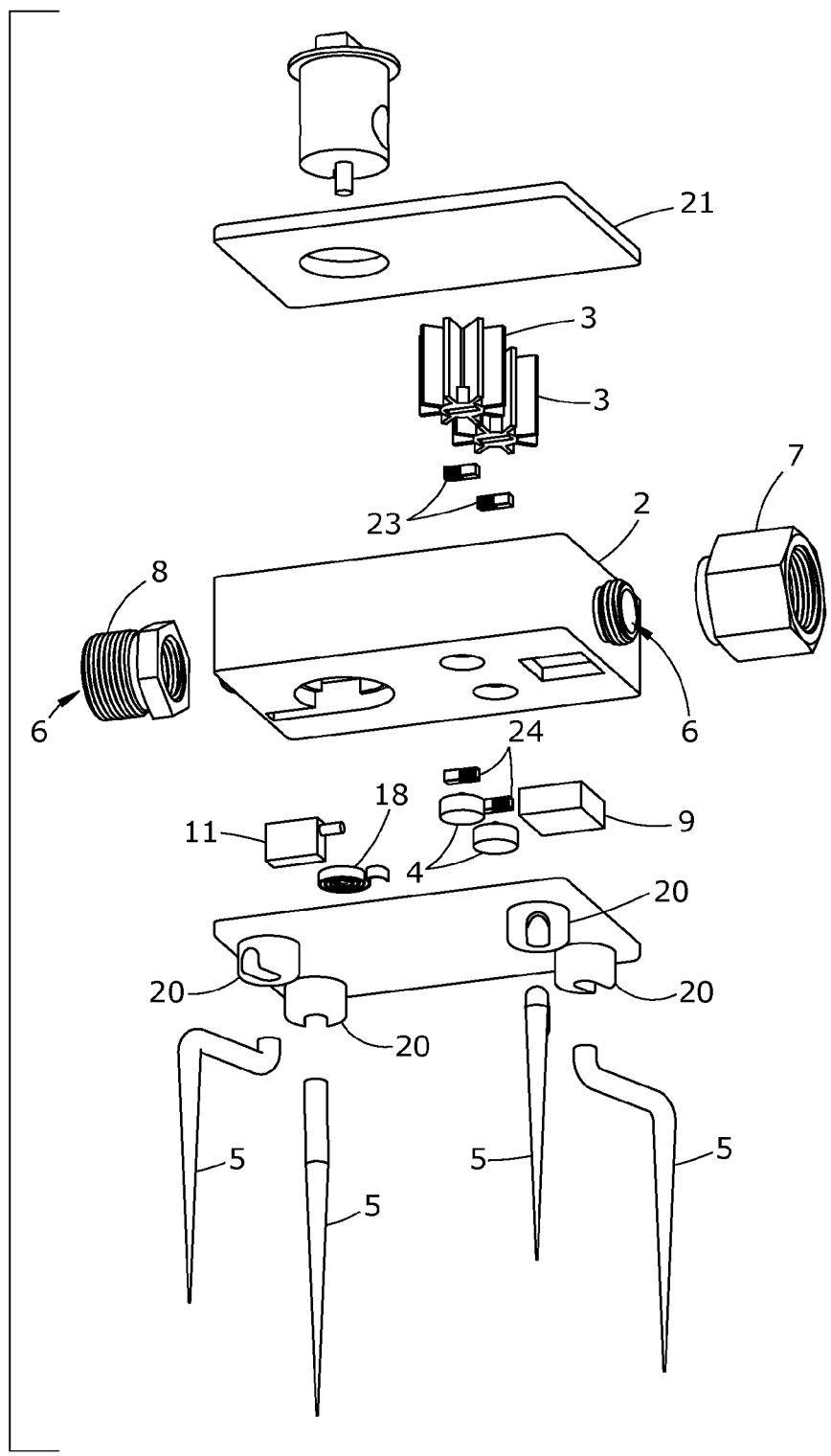
FIG. 17 shows the preferred embodiment from the perspective of a viewer to the left of the device, looking down at the device.

Referring to FIG. 17, the legs (5) and leg attachments (20) are shown, and the body (1) is shown. The attachment of hose to inlet (13), and attachment of hose to outlet (14) are also shown. The body (1) includes the frame (2), and the turbine (3), generator (4), channel (6), inlet (7), outlet (8), battery (9), electronic control mechanism (10), Solenoid (11), Valve (12), and spring (18), all of which are housed within the frame. The body (1) also includes the lower frame plate (22) and upper frame plate (21). The turbine magnets (23) and generator magnets (24) are also shown.

Figure 18:
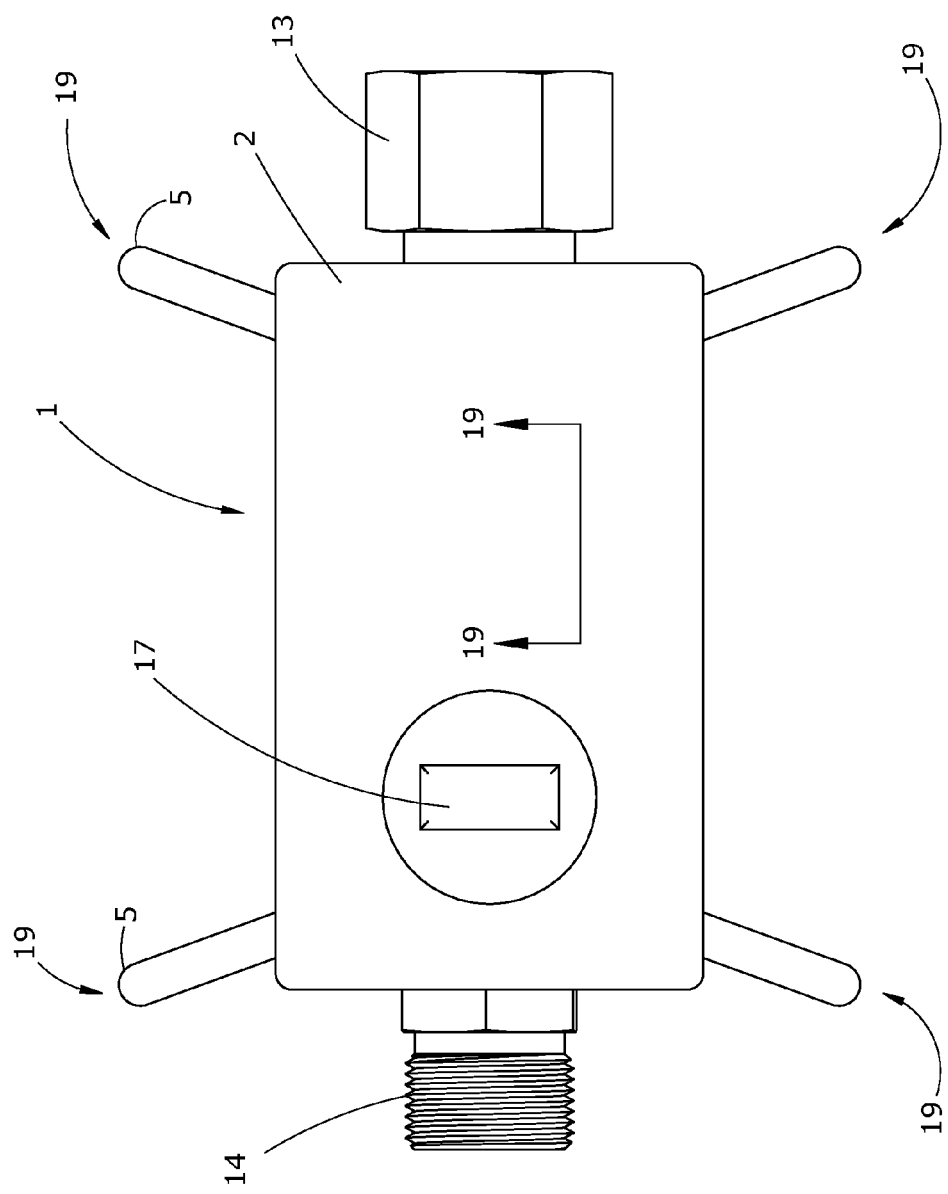
FIG. 18 shows the preferred embodiment from the perspective of a viewer directly above the device

Referring to FIG. 18, the body (1) is shown. The frame (2) is shown, with the attachment of hose to inlet (13) and the attachment of hose to the outlet (14) shown attached to the body. Two legs (5) and the sensors (19) are also shown. The valve lever (17) is shown as well. The number "19" refers to the area included in FIG. 19.

Figure 19:
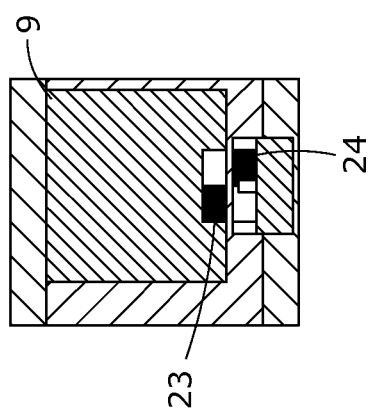
FIG. 19 is a picture of the type of battery to be used in the second embodiment.

Referring to FIG. 19, the battery (9) is shown. The turbine magnets (23) and generator magnets (24) are also shown.

What is claimed is:

1. A water sprinkler control irrigation unit comprising:
    a body of the water sprinkler irrigation control unit, comprising:
    a frame comprising an upper plate, a lower plate, a middle box, and containing the components;
    a water inlet opening connected to a hose for water to flow horizontally into the middle box;
    a water outlet opening connected to a hose for water to flow horizontally out of the middle box;
    a horizontal channel for water to flow between the water inlet and water outlet;
    a means for generating electrical power through the flow of water through the channel comprising two vertical turbines, positioned such that the water flowing through the channel causes each turbine to spin, and causes one electrical generator coupled to each turbine to a solenoid and a control system that is attached to said solenoid;
    two or more support legs comprising sensors for measuring water content in the ground, said leg protruding down from a leg attachment for affixing the legs and the sensors to the body of the water sprinkler irrigation control unit, so that the legs and the sensors are partially or fully buried in the ground, and the body of the unit is above the ground, and wherein said leg attachment is attached to the lower plate:
    a means for stopping the flow of water through the channel when the sensors detect that the water has reached a pre-programmed level comprising within the box, a valve, a spring, said solenoid, and said control system able to automatedly shut the valve, and comprising a valve lever on the upper plate able to manually open the valve; and
    wherein the sensors are configured to electronically communicate through the legs to the control system and the solenoid when the pre-programmed level is met, and the solenoid is configured to cause the valve to shut off, and stop the flow of water through the body.

2. The unit of claim 1 where the control system comprises an electronic control mechanism that causes the solenoid to shut the valve when the water content in the ground reaches a pre-programmed level.

3. The unit of claim 1, where the turbines and generator have two pairs of magnets affixed between them, and the pair of magnets affixed to the turbines cause the pair of magnets affixed to the generator to move as they spin.

4. The unit of claim 1, further comprising a means for fastening a hose to the water inlet.

5. The unit of claim 1, further comprising a means for fastening a hose to the water outlet.

6. The unit of claim 1, where the water inlet is circular.

7. The unit of claim 1, where the water outlet is circular.

8. The unit of claim 1, further comprising that the number of legs is four.

9. The unit of claim 1, further comprising that the frame is made out of plastic.

10. The unit of claim 1, where the opening for water to flow out of the unit is designed for a garden hose to be fastened to it.

11. The unit of claim 1 further comprising a battery charged by the generator to provide electrical power to the unit.

12. The unit of claim 1 further comprising a mechanism to open the valve to turn on the flow of water.

13. The unit of claim 1 wherein the control system is wirelessly controllable.

14. A water sprinkler control irrigation unit comprising:
    a body of the water sprinkler irrigation control unit, comprising:
    two or more support legs comprising sensors for measuring water content in the ground, each leg protruding down from a leg attachment for affixing the legs and sensors to a body of the water sprinkler irrigation control unit, so that the legs and sensors are partially or fully buried in the ground, and the body of the unit is above the ground;
    a frame comprising an upper plate, a lower plate, and a middle box, and containing the component:
    a water inlet opening connected to a hose for water to flow into the middle box;
    a water outlet opening connected to a hose for water to flow out of the middle box;
    a horizontal channel for water to flow between the water inlet and water outlet;
    a battery to provide electrical power to the unit;
    a means for stopping the flow of water through the channel when the sensors detect that the water has reached a pre-programmed amount comprising within the box, a valve, a spring and a solenoid to shut the valve, and comprising a valve lever on the upper plate to manually open the valve; and, a control system attached to the solenoid by which the means for stopping the flow of water through the channel can be controlled;

wherein the leg attachment is attached to the lower plate; and, wherein the sensors are configured to electronically communicate through the legs to the control system and the solenoid when the pre-programmed level is met, and the solenoid is configured to cause the valve to shut off, and stop the flow of water through the body.

15. The unit of claim 14 where the control system comprises an electronic control mechanism that causes the solenoid to shut the valve when the water content in the ground reaches a pre-programmed level.

16. The unit of claim 14, further comprising a means for fastening a hose to the water inlet.

17. The unit of claim 14, further comprising a means for fastening a hose to the water outlet.

18. The unit of claim 14, where the water inlet is circular.

19. The unit of claim 14, where the water outlet is circular.

20. The unit of claim 14, further comprising that the number of legs is four.

21. The unit of claim 14, further comprising that the frame is made out of plastic.

22. The unit of claim 14, further comprising that the number of legs is two.

* * * * *